United States Patent
Lasak et al.

(10) Patent No.: US 12,221,025 B2
(45) Date of Patent: Feb. 11, 2025

(54) METHOD FOR OPERATING A MOTOR VEHICLE SEAT SYSTEM

(71) Applicant: Faurecia Autositze GmbH, Hannover (DE)

(72) Inventors: Jacek Lasak, Jaroszów (PL); Maciej Such, Korczyna (PL); Michal Szott, Grojec (PL)

(73) Assignee: Faurecia Autositze GmbH, Hannover (DE)

( * ) Notice: Subject to any disclaimer, the term of this patent is extended or adjusted under 35 U.S.C. 154(b) by 265 days.

(21) Appl. No.: 18/145,298

(22) Filed: Dec. 22, 2022

(65) Prior Publication Data

US 2023/0211713 A1 Jul. 6, 2023

(30) Foreign Application Priority Data

Jan. 4, 2022 (DE) .......................... 102022100116.4

(51) Int. Cl.
*B60N 2/90* (2018.01)
(52) U.S. Cl.
CPC ............. *B60N 2/914* (2018.02); *B60N 2/976* (2018.02)
(58) Field of Classification Search
CPC .......... B60N 2/665; B60N 2/99; B60N 2/914; B60N 2/976
USPC ..................................................... 297/284.6
See application file for complete search history.

(56) References Cited

U.S. PATENT DOCUMENTS

| | | | |
|---|---|---|---|
| 4,655,505 A | 4/1987 | Kashiwamura | |
| 6,988,508 B2 * | 1/2006 | Bauer | F15B 13/0402 297/284.6 |
| 8,794,707 B2 * | 8/2014 | Bocsanyi | B60N 2/665 297/284.6 |
| 10,743,668 B2 * | 8/2020 | Sakai | B60N 2/68 |
| 2019/0106031 A1 | 4/2019 | Lem | |

FOREIGN PATENT DOCUMENTS

| | | |
|---|---|---|
| DE | 102017113498 A1 | 12/2017 |
| EP | 0929248 A1 | 7/1999 |
| JP | 5358244 B2 | 12/2013 |

* cited by examiner

*Primary Examiner* — Milton Nelson, Jr.
(74) *Attorney, Agent, or Firm* — Laurence P. Colton; Smith Tempel Blaha LLC

(57) ABSTRACT

A method for operating a motor vehicle seat system, having at least two first fluid-fillable bladders and at least one second fluid-fillable bladder connected via a supply line to a common line and to a pump via this line and are fillable with fluid via this line, each first bladder having its own discharge outlet, and the second bladder not having its own discharge outlet, and having a controller which controls the filling or emptying of the bladders, the controller being configured to empty the second bladder via a discharge outlet from one of the first bladders, the second bladder being evacuated by detecting which of the first bladders is empty or is currently not used, establishing a fluid connection between the second bladder to be evacuated and the empty first bladder, and opening the discharge outlet belonging to the empty first bladder.

9 Claims, 3 Drawing Sheets

METHOD FOR OPERATING A MOTOR VEHICLE SEAT SYSTEM

CROSS REFERENCE TO RELATED APPLICATIONS

This patent application claims the benefit of and priority on German Patent Application No. 10 2022 100 116.4 having a filing date of 4 Jan. 2021.

BACKGROUND OF THE INVENTION

Technical Field

The invention relates to a method for operating a motor vehicle seat system, wherein the motor vehicle seat system comprises a plurality of fluid-fillable bladders, wherein these are connected via a respective supply line to a common line and to a pump via this common line and are fillable with fluid via this common line, and is known from DE 10 2017 113 498 A1, which is incorporated herein by this reference.

Prior Art

In principle, it is known from the prior art, for example U.S. Pat. No. 4,655,505, EP 929248 A1, JP 5358244 B2 or US 2019/0106031 A1, to use fluid-fillable bladders in motor vehicle seats. Such pneumatic devices are usually controlled by means of a valve block, which is generally intended to implement static and dynamic seat functions. Static seat functions are functions which are usually preset by the user, while dynamic functions are functions which, for example during driving, result in corresponding bladders being regularly filled with fluid or evacuated. Examples of dynamic functions are, for example, massage functions in which the bladders are periodically filled and emptied according to a predetermined pattern or the active curve support of the side bolsters.

As a rule, as shown in FIG. 1A, such dynamic bladders 4-6 and static bladders 7, 8 are supplied with fluid by a pump 1 via a common line. For this purpose, the individual bladders 4-6 and 7, 8 are connected to the common line 2 via the respective supply lines 24, 25, 26 or 27, 28. Respective valves 41, 51, 61 and 71, 81 ensure a fluid connection between the respective bladder 4-6 or 7, 8 and the common line 2. The corresponding flow path can be opened or blocked at any time via a controller (not shown here). For the evacuation process, the dynamic bladders 4-6 each use separate evacuation outputs 42, 52, 62, while the static bladders 7, 8 do not have separate evacuation outputs, but are evacuated when necessary via an outlet valve 3 connected to the common line 2.

If the static bladder is, for example, part of a conventional side support, such an evacuation process as shown in FIG. 1B can proceed approximately as follows: in step S1, the evacuation of the side support is started. In step S2, the associated valve 71 or 81 is subsequently opened. In addition, in step S3, the outlet valve 3 is opened at the same time as or already before the outlet valve 3, and air can escape from the bladders 7 or 8. This is usually done by actuating a switch (not shown here). In step S4, it is therefore queried whether this switch is still actuated. If not, all valves 71, 81, 3 are closed, step S6, and the evacuation is ended, step S7. If it is determined in step S4 that the switch is still actuated, it is queried whether the function has ended temporarily, step S5. If yes, step S6 continues and the evacuation is ended. If no, the method is continued with step S4.

In principle, dynamic and static bladders can thus be controlled via known motor vehicle seat systems. However, there is always the need for improvements in this area. In particular, the space saving and also the cost saving always play a role.

It is therefore an object of the present invention to optimize the method for operating a motor vehicle seat system of the type mentioned at the outset.

This object is achieved by a method for operating a vehicle seat system, which comprises a plurality of fluid-fillable bladders, wherein these are connected via a respective supply line to a common line and to a pump via this common line and are fillable with fluid via this common line, wherein at least two first fluid-fillable bladders and at least one second fluid-fillable bladder are present, wherein each first fluid-fillable bladder is assigned its own discharge outlet, wherein the at least one second fluid-fillable bladder does not have its own discharge outlet, wherein the motor vehicle seat system comprises a controller which controls the filling or emptying of the fluid-fillable bladders via the supply lines or the emptying of the fluid-fillable bladders via the discharge outlets, wherein the controller is configured to carry out the emptying of the at least one second fluid-fillable bladder via a discharge outlets from one of the first fluid-fillable bladders, characterized in that the at least one second fluid-fillable bladder is evacuated, by executing the following steps: a) the bladder of the first fluid-fillable bladders is detected which is empty or is currently not used, b) a fluid connection is established between the second fluid-fillable bladder to be evacuated and the first fluid-fillable bladder determined in step a), and c) the discharge outlet belonging to the first fluid-fillable bladder detected in step a. is opened. Advantageous embodiments can be found in the dependent claims.

The motor vehicle seat system used for the method according to the invention has a plurality of fluid-fillable bladders, wherein these are connected via a respective supply line to a common line and via this common line to a pump and can be filled with fluid via this common line. At least two first fluid-fillable bladders, preferably at least three first fluid-fillable bladders, and at least one second fluid-fillable bladder are present. The fluid-fillable bladders can be filled with any type of fluid, but preferably air, other gaseous or liquid substances can also be used. Each first fluid-fillable bladder is assigned its own separate discharge outlet. The at least one second fluid-fillable bladder itself does not have a suitable discharge outlet. The motor vehicle seat system further comprises a controller which controls the filling of the fluid-fillable bladders via the supply lines or the emptying of the fluid-fillable bladders via the discharge outlets. According to the invention, the controller is configured to cause the at least one second fluid-fillable bladder to be emptied via a discharge outlet from one of the first fluid-fillable bladders. In this way, for the second fluid-fillable bladder during evacuation, an already existing but currently not used discharge outlet of the dynamic bladders can be used. A separate outlet valve connected to the common line can thus be completely omitted, which, on the one hand, requires a total of fewer components, since lines and components which are present in any case are used for venting the static or second fluid-fillable bladder, and on the other hand the installation space is also reduced. This also saves costs since the number of components required is reduced.

The first fluid-fillable bladders are preferably equipped with a dynamic function within the motor vehicle seat system by being filled or emptied by the controller according to specification. The at least one second fluid-fillable bladder is preferably equipped with a static function within the motor vehicle seat system by being able to be filled or emptied by a user. Control of the dynamic function is generally designed such that one of the plurality of first bladders is always unused or empty. The supply line of this currently unused or empty bladder can then be used for evacuation of a second bladder. Within the motor vehicle seat system according to the invention, the first fluid-fillable bladders are preferably configured for massage or active adjustment by the controller for adapting to a changed driving situation. Of course, they can also perform other dynamic functions.

It is furthermore preferably provided that the at least one second fluid-fillable bladder is part of a side bolster adjustment, shoulder support adjustment, seat depth adjustment or lumbar support adjustment of the motor vehicle seat to be adjusted by a seat occupant by means of a switch present in the motor vehicle seat system. Other static functions are also conceivable.

According to an advantageous embodiment of the present invention, it is provided that for each first fluid-fillable bladder and each second fluid-fillable bladder in the respective supply line a filling valve is arranged, which in the open state allows fluid exchange between the common line and the respective bladder. The common line and also the filling valves can be arranged, for example, within a valve block. The fluid exchange can take place in both directions, i.e., for filling the respective bladder and for emptying the same.

In the method according to the invention for operating the above-described motor vehicle seat system, a second fluid-fillable bladder is now evacuated by carrying out the following steps:
a) the bladder of the first fluid-fillable bladders is detected which is empty or is currently not used,
b) a fluid connection is produced between the second fluid-fillable bladder to be evacuated and the first fluid-fillable bladder determined in step a), and
c) the discharge outlet belonging to the first fluid-fillable bladder determined in step a. is opened.

The method therefore provides that a first fluid-fillable bladder which is not currently used or empty is always detected by the controller of the motor vehicle seat system, this can be done, for example, by measuring the pressure in the first fluid-fillable bladders in step a). According to the invention, the supply line and the discharge outlet of this detected first fluid-fillable bladder are then used for evacuation of the second fluid-fillable bladder to be emptied or evacuated. The fluid connection produced in step b) in this case preferably leads from the bladder to be evacuated via the associated supply line, the common line and the supply line belonging to the first fluid-fillable bladder selected in step a) up to the associated discharge outlet. In this way, existing components can also be used more effectively for other functions. The performance of such a method saves installation space and costs, since additional components are not required for evacuation of the second fluid-fillable bladders.

Expediently, a switch is provided on the motor vehicle seat system which allows the actuation of an evacuation process of a second fluid-fillable bladder by a user. Preferably, the fluid connection produced in step b) and the opening of the discharge outlet occurring in step c) is maintained only until the corresponding switch is actuated. The switch can be designed, for example, in the form of a button which only activates the corresponding evacuation function as long as the button is pressed.

The invention will be explained in more detail in the following with reference to FIGS. 2A to 2B.

Figure 1A:
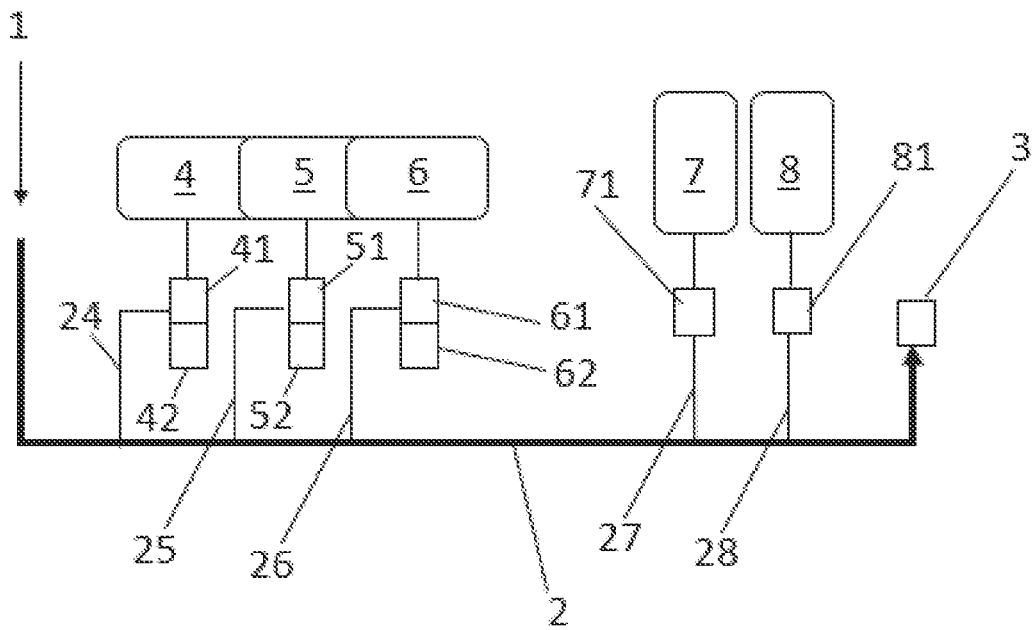
FIG. 1A shows a part of a motor vehicle seat system according to the prior art.
Figure 2A:
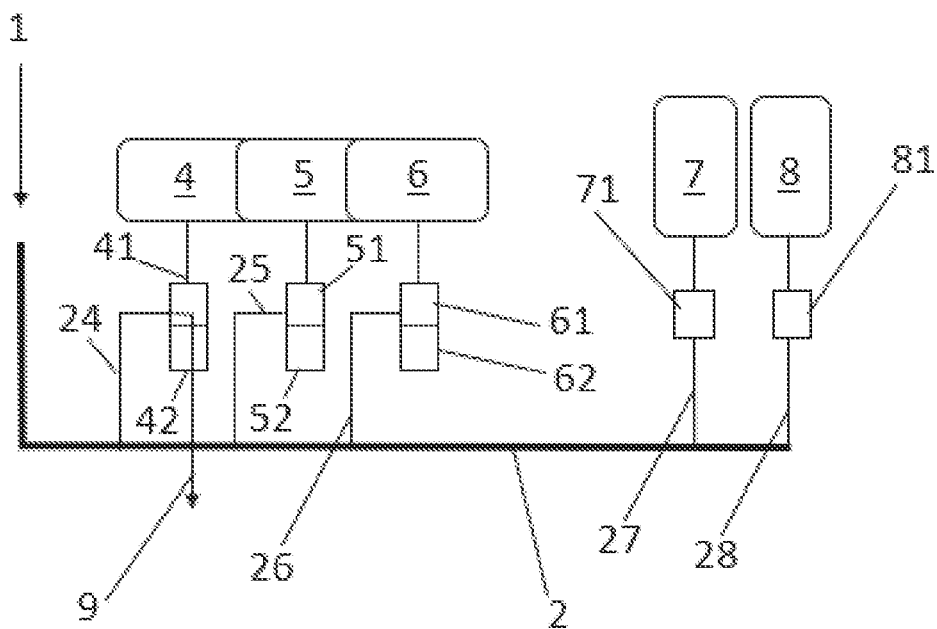
FIG. 2A shows a part of a motor vehicle seat system used in the method according to the invention.

The illustration shown in FIG. 2A largely corresponds to the illustration of FIG. 1A, so that reference can be made to the above statements in the introduction to avoid repetition. In contrast to the illustration in FIG. 1A, an outlet valve 3 is missing in FIG. 2A. The filling process of the bladders 7, 8 as well as of the first bladders 4-6 takes place via the common line 2 by opening the respective filling valves 41, 51, 61 and 71, 81, and by introducing fluid, for example air, into the common line 2 via a pump 1. The discharge outlets 42, 52, 62 serve to empty the first fluid-fillable bladders 4-6. The second fluid-fillable bladders 7, 8 are emptied in that the associated filling valve 71, 81 is opened, the fluid then flows out of the respective bladder 7, 8 through the filling valve 71 or 81 into the associated supply line 27, 28 and from there into the common line 2. The pump 1 is switched off at this moment. The controller detects which of the first fluid-fillable bladders 4-6 is currently not active or empty. This means that the corresponding discharge outlet 42, 52, 62 (in the example shown the discharge outlet 42) can be used. This discharge outlet 42 is then opened and, preferably when the associated filling valve 41 is open, the fluid evacuated from the first bladder 7, 8 into the common line 2 reaches the supply line 24 and from there out into the discharge outlet 42 and can be discharged.

Figure 2B:
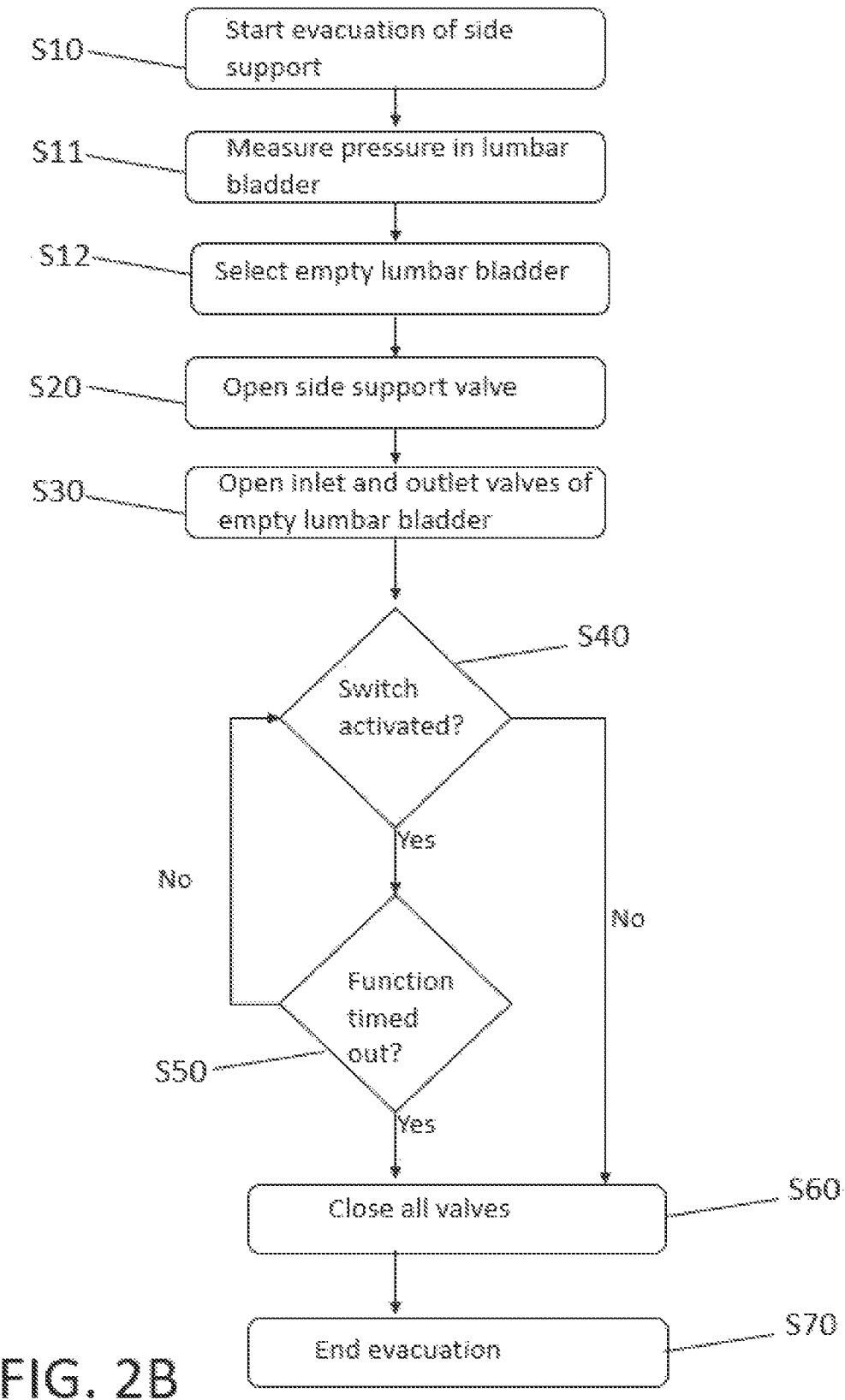
FIG. 2B shows a flow chart illustrating an embodiment for the method according to the invention.

The flow chart in FIG. 2B describes an embodiment in which the static function of a first bladder 7, 8 is realized, for example, by a side support. In the example shown, lumbar bladders are used as dynamic bladders 4-6, for example.

Figure 1B:
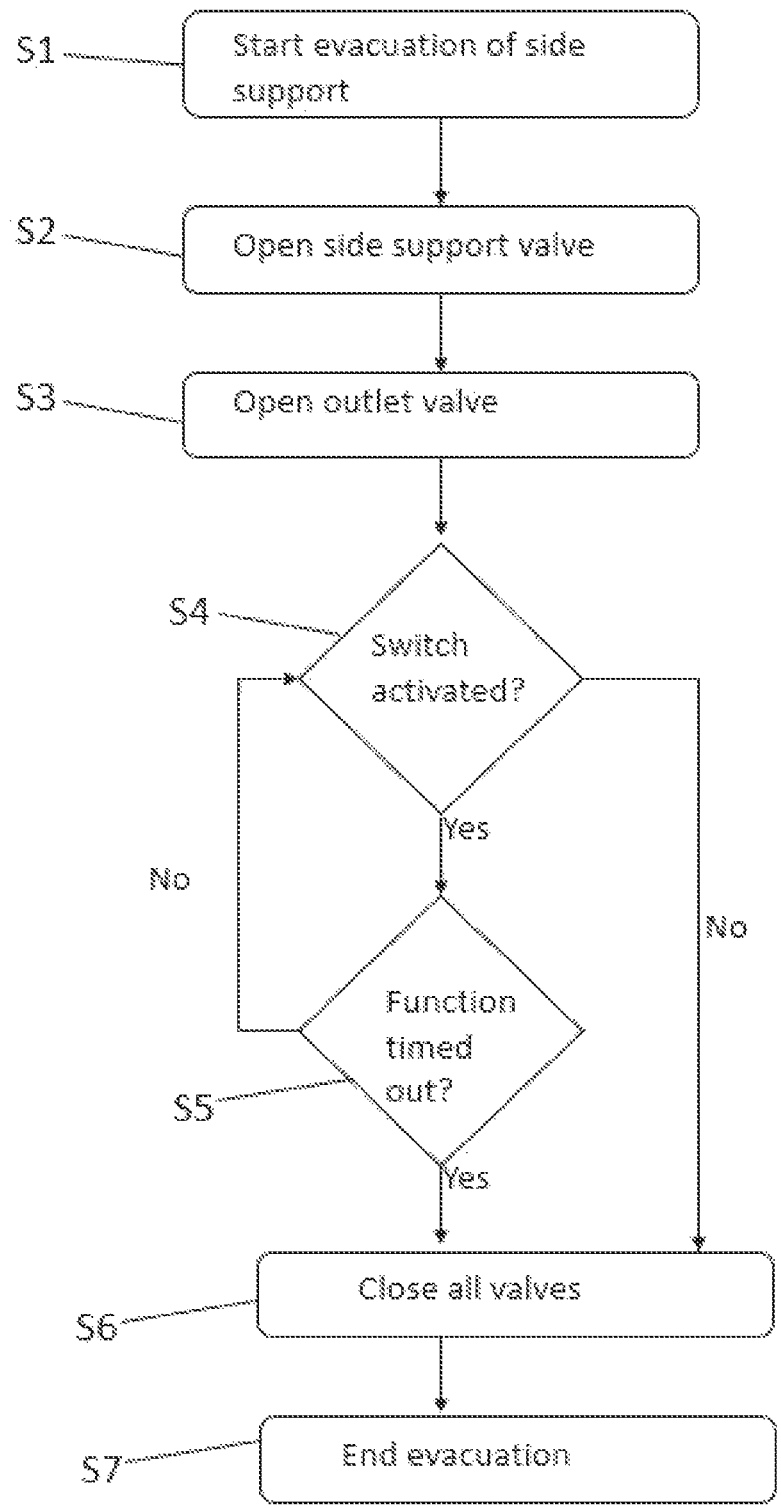
FIG. 1B shows a flow chart to illustrate the functioning of the system shown in FIG. 1A.

If the control—for example by actuating a switch by the user—starts to empty the first bladder in the side support, step S10, the pressure in the second bladders 4-6 (cf. FIG. 1B) is initially measured, S11. The pressure measurement detects which of the second bladders 4-6 is empty. The controller then selects this empty bladder (in FIG. 1B is the bladder 4), step S12, and now knows that the evacuation pathway of the first bladder 7, 8 passes through the discharge outlet 42 of the empty bladder 4. The side support valve or filling valve 71, 81 of a first bladder 7, 8 is then opened, step S20. The filling valve or inlet valve 41 and the discharge outlet or the outlet valve 42 of the selected first bladder 4 are now opened by the controller, step S30. In the following, it is queried whether the switch is still actuated, step S40. If not, all valves 71, 81, 41, 42 are closed, step S60, and the evacuation is ended, step S70. If it is determined in step S40 that the switch is still actuated, it is queried whether the function has ended temporarily, step S50. If yes, step S60 continues and the evacuation is ended. If no, the method is continued with step S40.

What is claimed is:
1. A method for operating a motor vehicle seat system, which comprises a plurality of fluid-fillable bladders (4-6; 7,8), wherein these are connected via a respective supply line (24-26; 27, 28) to a common line (2) and to a pump (1) via this common line (2) and are fillable with fluid via this common line (2), wherein at least two first fluid-fillable bladders (4-6) and at least one second fluid-fillable bladder (7, 8) are present, wherein each first fluid-fillable bladder

(4-6) is assigned its own discharge outlet (42-62), wherein the at least one second fluid-fillable bladder (7, 8) does not have its own discharge outlet, wherein the motor vehicle seat system comprises a controller which controls the filling or emptying of the fluid-fillable bladders (4-6; 7,8) via the supply lines (24-26; 27, 28) or the emptying of the fluid-fillable bladders (4-6; 7,8) via the discharge outlets (42-62), wherein the controller is configured to carry out the emptying of the at least one second fluid-fillable bladder (7, 8) via a discharge outlet (42-62) from one of the first fluid-fillable bladders (4-6), wherein the at least one second fluid-fillable bladder (7, 8) is evacuated, by executing the following steps:

- a) the bladder (4) of the first fluid-fillable bladders (4-6) is detected which is empty or is currently not used;
- b) a fluid connection is established between the second fluid-fillable bladder (7, 8) to be evacuated and the first fluid-fillable bladder (4) determined in step a); and
- c) the discharge outlet (42) belonging to the first fluid-fillable bladder (4) detected in step a) is opened.

2. The method according to claim 1, wherein pressure in the first fluid-fillable bladders (4-6) is measured in step a).

3. The method according to claim 1, wherein the fluid connection produced in step b. and the opening of the discharge outlet (42) occurring in step c) is maintained only until a corresponding switch is actuated.

4. The method according to claim 1, wherein the fluid connection produced in step b) leads from the bladder (7, 8) to be evacuated via the associated supply line (27, 28), the common line (2) and the supply line (24) belonging to the first fluid-fillable bladder (4) selected in step a) leads to the associated discharge outlet (42).

5. The method according to claim 1, wherein the three-first fluid-fillable bladders (4-6) are present at least in the motor vehicle seat system.

6. The method according to claim 1, wherein the first fluid-fillable bladders (4-6) are filled or emptied by means of the controller and that the at least one second fluid-fillable bladder (7, 8) is filled or emptied by a user.

7. The method according to claim 1, wherein the first fluid-fillable bladders (4-6) are configured for massage or active adjustment by the controller for adapting to a changed driving situation.

8. The method according to claim 1, wherein the at least one second fluid-fillable bladder (7, 8) is part of a side bolster adjustment, shoulder rest adjustment, seat depth adjustment or lumbar support adjustment of the motor vehicle seat to be adjusted by a seat occupant by means of a switch in the motor vehicle seat system.

9. The method according to claim 1, further comprising a filling valve (41, 51, 61; 71, 81) arranged in each case for each first fluid-fillable bladder (4-6) and each second fluid-fillable bladder (7, 8) in the respective supply line (24, 25, 26; 27, 28), which filling valve allows fluid exchange between the common line (2) and the respective bladder (4-8) in the open state.

* * * * *